US010108229B2

(12) United States Patent
Lin

(10) Patent No.: US 10,108,229 B2
(45) Date of Patent: Oct. 23, 2018

(54) ELECTRONIC DEVICE WITH ELECTRICALLY COUPLING LOCK

(71) Applicant: HEWLETT-PACKARD DEVELOPMENT COMPANY, L.P., Houston, TX (US)

(72) Inventor: Te-Yueh Lin, Taipei (TW)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/539,783

(22) PCT Filed: Jan. 12, 2015

(86) PCT No.: PCT/US2015/011037
§ 371 (c)(1),
(2) Date: Jun. 26, 2017

(87) PCT Pub. No.: WO2016/114753
PCT Pub. Date: Jul. 21, 2016

(65) Prior Publication Data
US 2017/0371375 A1    Dec. 28, 2017

(51) Int. Cl.
G06F 1/16       (2006.01)
H01M 2/10      (2006.01)
E05B 47/00     (2006.01)
E05B 65/00     (2006.01)

(52) U.S. Cl.
CPC ........ G06F 1/1635 (2013.01); E05B 47/0001 (2013.01); E05B 65/0067 (2013.01); H01M 2/1022 (2013.01)

(58) Field of Classification Search
CPC ..... G06F 1/1613; G06F 1/1616; G06F 1/1635
See application file for complete search history.

(56) References Cited

U.S. PATENT DOCUMENTS 5,578,391 A * 11/1996 Meyers ............... H01M 2/1022
                                                429/123
5,740,012 A    4/1998 Choi
5,841,630 A * 11/1998 Seto ...................... G06F 1/1616
                                                361/679.58
5,955,797 A *  9/1999 Kim ...................... G06F 1/1616
                                                307/150

(Continued)

FOREIGN PATENT DOCUMENTS

CN      201444493 U    4/2010
EP          853826      6/2003

(Continued)

Primary Examiner — Anthony Q Edwards
(74) Attorney, Agent, or Firm — HPI Patent Department

(57) ABSTRACT

In some examples, an electronic device includes an electronic component, a battery pack that is dockable to the electronic component, and a lock to lock a docked battery pack to the electronic device. In some examples, the lock is to move to a locked state in which the docked battery pack is to be locked to the electronic device and electrically coupled to the electronic component to power the electronic component using the docked battery pack and the lock is to move to an unlocked state in which the docked battery pack is to be unlocked from the electronic device and electrically isolated from the electronic component.

14 Claims, 5 Drawing Sheets

Locked state

Unlocked state

(56) References Cited

U.S. PATENT DOCUMENTS

| | | | | |
|---|---|---|---|---|
| 6,115,244 | A * | 9/2000 | Chen | H05K 7/1409 |
| | | | | 361/679.32 |
| 6,211,648 | B1 * | 4/2001 | Chew | H01M 2/1022 |
| | | | | 320/112 |
| 6,261,715 | B1 * | 7/2001 | Nakamura | G06F 1/1616 |
| | | | | 429/100 |
| 6,274,266 | B1 * | 8/2001 | Wang | H01M 2/1055 |
| | | | | 320/107 |
| 6,371,535 | B2 * | 4/2002 | Wei | G06F 1/1616 |
| | | | | 292/175 |
| 6,411,505 | B1 * | 6/2002 | DiFonzo | G06F 1/1616 |
| | | | | 361/679.38 |
| 7,261,574 | B2 * | 8/2007 | DeLuga | E05C 19/022 |
| | | | | 439/152 |
| 8,172,282 | B2 * | 5/2012 | Lev | E05B 65/006 |
| | | | | 292/110 |
| 9,118,059 | B2 * | 8/2015 | Kawada | H01M 2/1066 |
| 9,437,848 | B2 * | 9/2016 | Pendry | H01M 2/1055 |
| 9,871,234 | B2 * | 1/2018 | Pendry | H01M 2/1055 |
| 2004/0191614 | A1 * | 9/2004 | Iwasaki | G06F 1/1601 |
| | | | | 429/96 |
| 2007/0165480 | A1 * | 7/2007 | Wulff | G06F 1/1613 |
| | | | | 365/230.06 |
| 2010/0026099 | A1 | 2/2010 | Oguri | |
| 2011/0211325 | A1 | 9/2011 | Kawada et al. | |
| 2014/0347013 | A1 | 11/2014 | Kim | |

FOREIGN PATENT DOCUMENTS

| | | |
|---|---|---|
| JP | 2007259671 A | 10/2007 |
| JP | 002142377 A | 5/2015 |

* cited by examiner

Unlocked state
(Docked but electrically isolated from the electronic component)

Locked state
(Docked and electrically coupled to the electronic component)

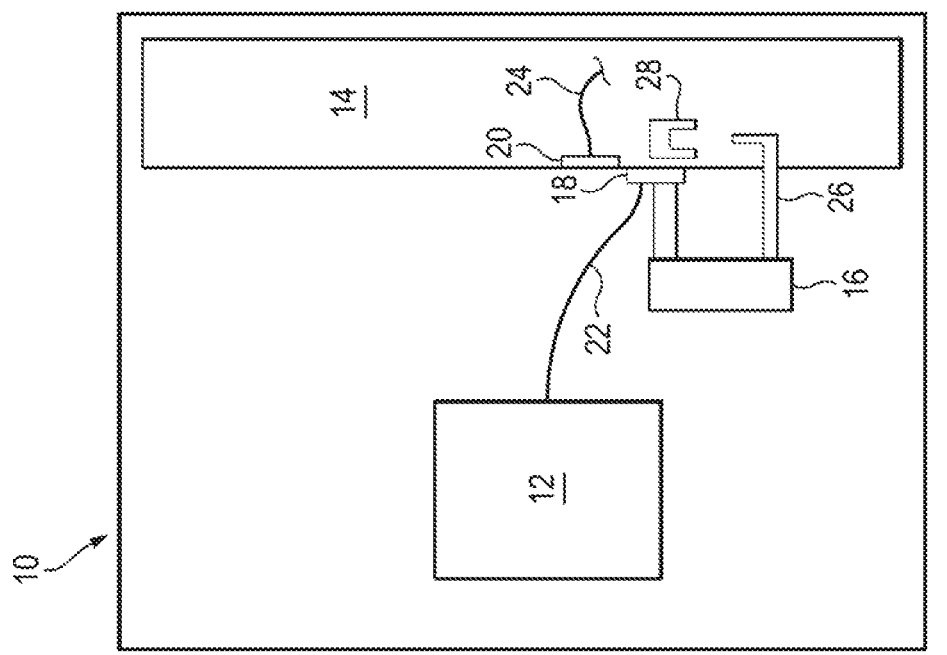
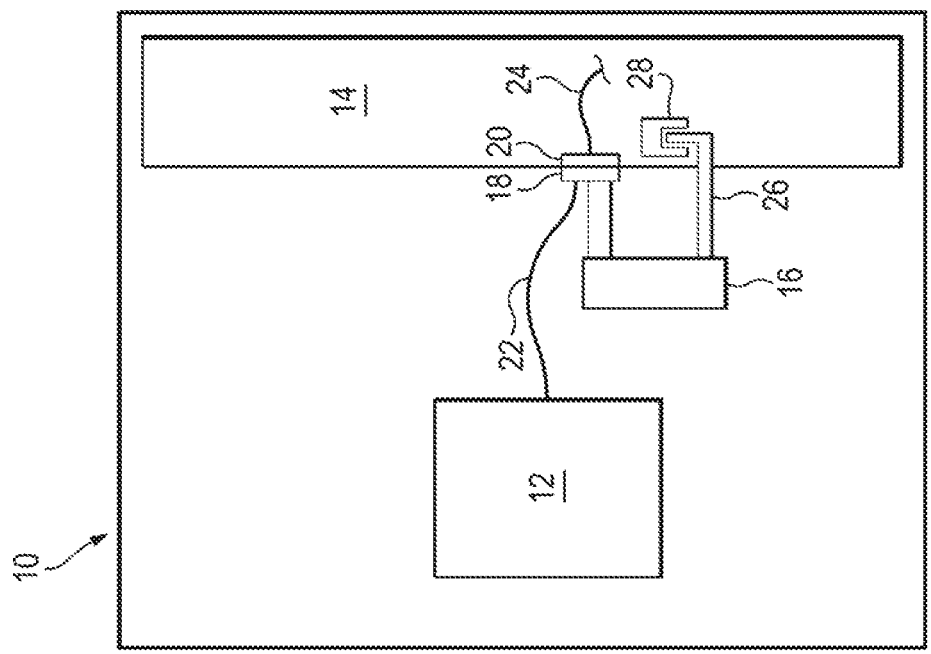

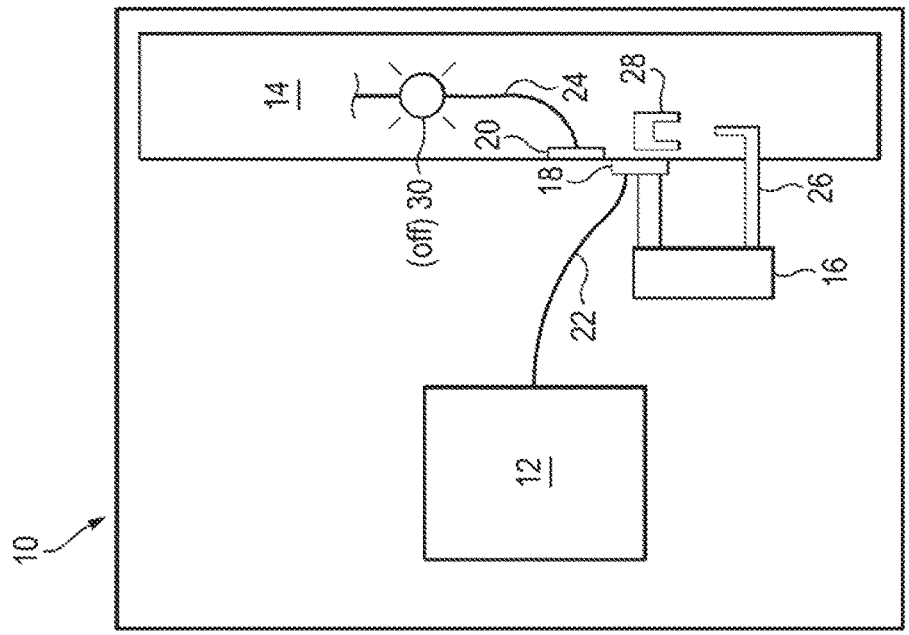
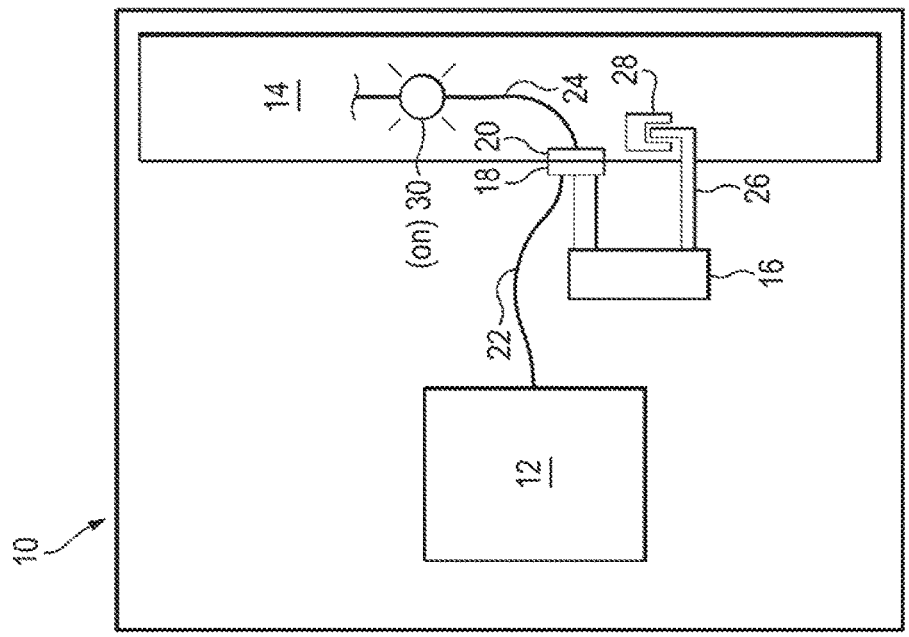

Locked state
(Docked and electrically coupled to the electronic component)

Unlocked state
(Docked but electrically isolated from the electronic component)

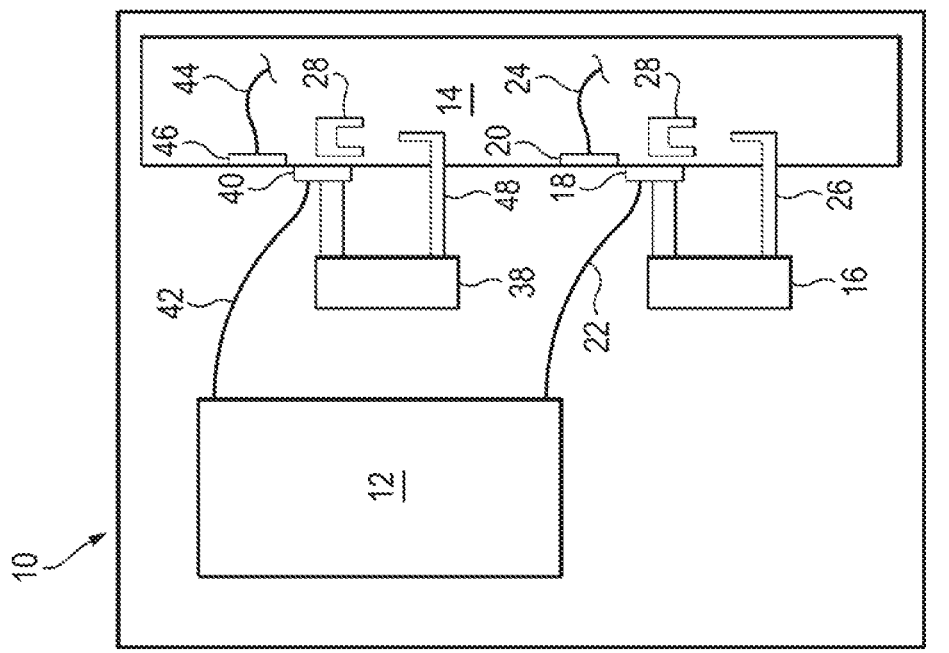
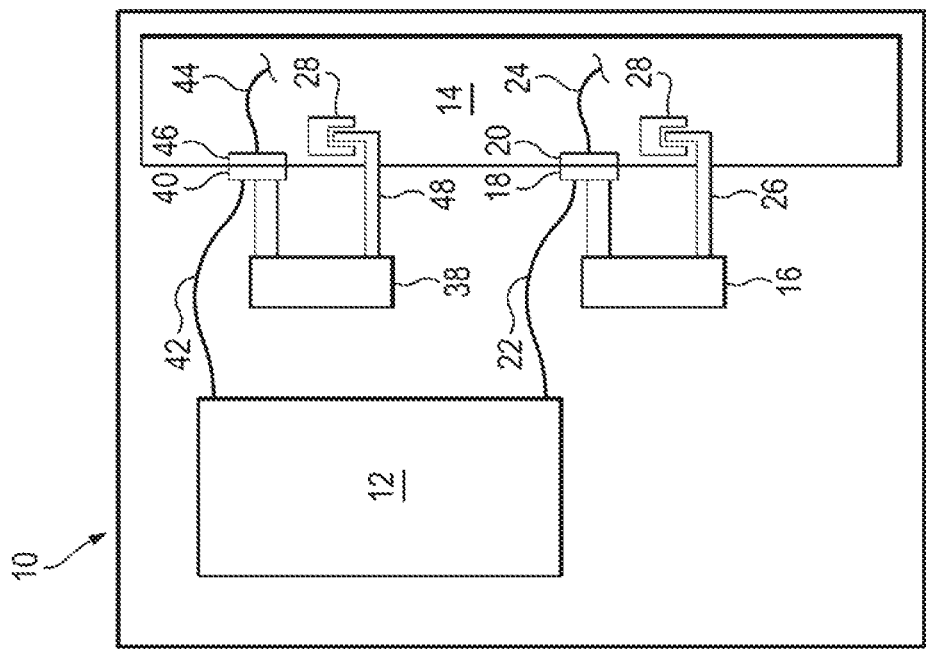

ELECTRONIC DEVICE WITH ELECTRICALLY COUPLING LOCK

BACKGROUND

Electronic devices often include electronic components that are powered by internal or external power sources. In some electronic devices, the power source can be locked in place by a user to secure the power source to the electronic device. For example, with respect to certain removable battery packs, a cavity can be provided in the electronic device to receive and align the battery pack with electrical contacts of an electronic component of the electronic device. The battery pack can then be locked into place within the cavity, such as for example by securing a battery pack retaining cover to the electronic device or by engaging a movable latch or other retaining structure.

BRIEF DESCRIPTION OF THE DRAWINGS

For a detailed description of various examples, reference will now be made to the accompanying drawings in which:

FIGS. 2a and 2b illustrate an electronic device in locked and unlocked states, according to another example.

FIGS. 3a and 3b illustrate an electronic device in locked and unlocked states, according to another example.

FIGS. 5a and 5b illustrate an electronic device in locked and unlocked states, according to another example.

NOTATION AND NOMENCLATURE

Figure 1B:
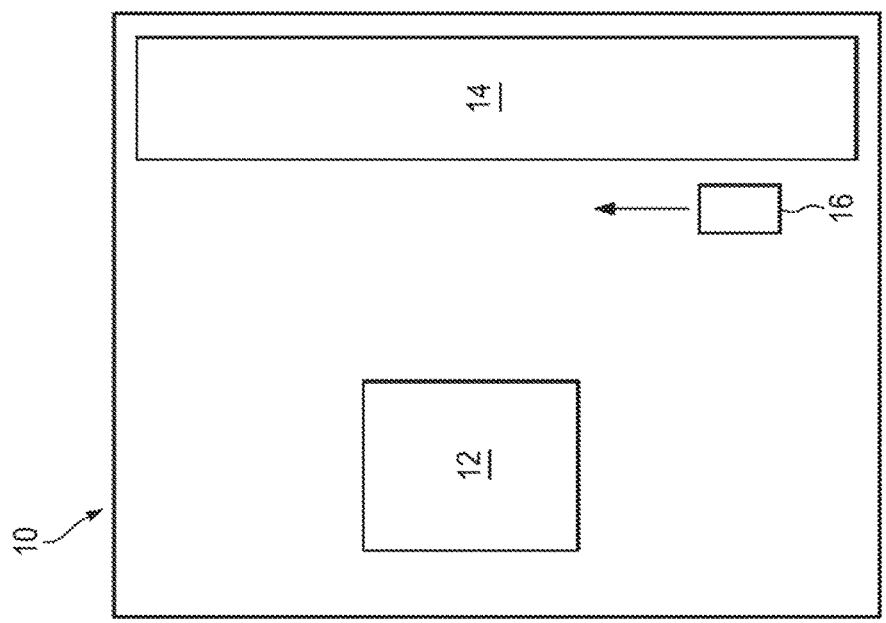
FIGS. 1a and 1b illustrate an electronic device in locked and unlocked states, according to an example.

In the following discussion and in the claims, the terms "including" and "comprising" are used in an open-ended fashion, and thus should be interpreted to mean "including, but not limited to . . . ." Also, the term "couple" or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, and/or (3) through another suitable coupling.

DETAILED DESCRIPTION

The following discussion is directed to various examples and implementations of the disclosure. Although one or more of these examples and implementations may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

As described above, electronic devices can include one or more locks or other retaining structures to secure a power input, such as a battery pack, to the electronic device. Notwithstanding the existence of such locks, users may nevertheless fail to completely lock the power input to the electronic component. For example, if an electronic device includes multiple locks, a user may fail to lock every lock. Moreover, for electronic devices that include a cavity sized to snugly fit a battery pack or other power input, a user may believe that such an arrangement is sufficient to secure the power input without additionally locking the power input in place. However, if the power input is not properly locked to the electronic device, the electronic device may lose power during transit or if the electrical connection coupling between the docked battery pack and the electronic component is otherwise disturbed.

The present disclosure describes electronic devices and related components that are designed to address these issues. For example, in one example, an electronic device includes a lock that can move between a locked state and an unlocked state. In the locked state, the electronic component is locked to a docked power input and electrically coupled to the docked power input to power the electronic component using the docked power input. In the unlocked state, the electronic component is unlocked from the docked power input and electrically isolated from the docked power input. In some implementations, this arrangement can prevent the docked power input from powering the electronic device unless the docked power input is also locked in place. This can, in some implementations, ensure that an electrical connection between the docked power input and the electronic device is secure in order to reduce the chance of power loss when the electronic device is moved or otherwise disturbed.

Figure 1A:
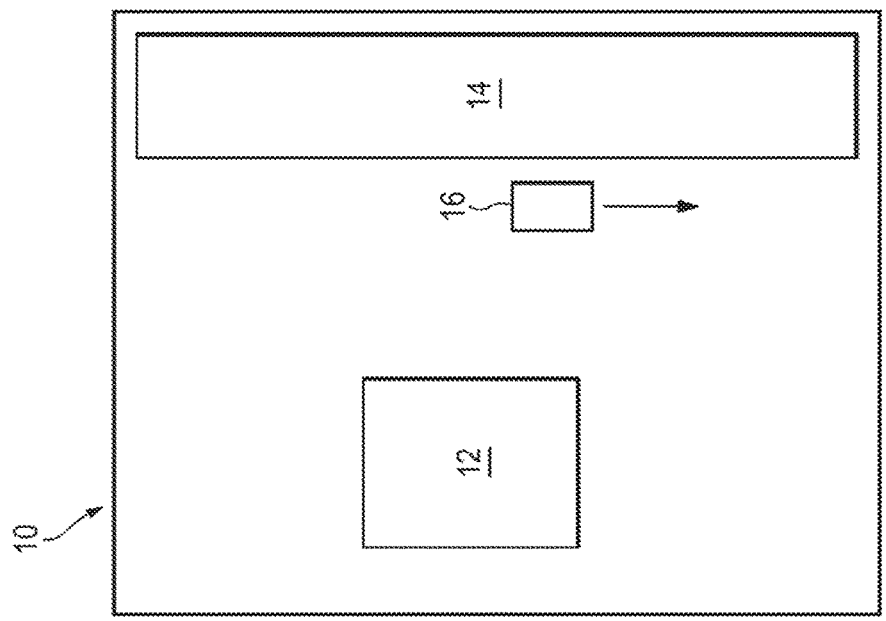

FIGS. 1a-b is a bottom view of an example electronic device 10 in locked and unlocked states, respectively. As described in further detail below, electronic device 10 includes an electronic component 12, a power input in the form of a battery pack 14 that is dockable to electronic device 10 (battery pack 14 is shown already docked to electronic component 12 in FIGS. 1a-b), and a lock 16 to lock docked battery pack 14 to electronic component 12. As described in further detail below, lock 16 is to move to a locked state (shown, for example, in FIG. 1a) in which docked battery pack 14 is to be locked to electronic device 10 and electrically coupled to electronic component 12 to power electronic component 12. Lock 16 is also to move to an unlocked state (shown, for example, in FIG. 1b) in which docked battery pack 14 is to be unlocked from electronic device 10 and electrically isolated from electronic component 12.

The term "docked" as used herein is intended to refer to a power input, such as for example battery pack 14, that is at least partially received by electronic device 10 but not necessarily locked to electronic device 10. For example, with respect to certain implementations of electronic device 10 in the form of a laptop, the electronic device 10 may include a cavity designed to receive but not lock battery pack 14. With respect to the view of battery pack 14 of FIGS. 1a-b, walls of a cavity of electronic device 10 can snugly secure docked battery pack 14 in lateral directions (i.e., along the X- and Y-dimensions with respect to FIGS. 1a-b) but not secure docked battery pack in non-lateral directions (i.e., along the Z-dimension with respect to FIGS. 1a-b). A user can then actuate lock 16 in order to lock battery pack 14 in place to prevent disconnection of the electrical coupling between electronic component 12 and battery pack 14 if battery pack 14 is jostled in a non-lateral direction. As a result, the term "docked" as used herein is intended to refer to a state in which a power input is at least partially received by an electronic device but not necessarily locked into place. The term "locked" as used herein is intended to refer to a state in which the power input is at least partially received by an electronic device and is also locked into place with respect to the electronic device. In various implementations of electronic devices described herein, the electronic device is designed such that a docked power input is electrically coupled to the electronic device when the docked power input is locked but is electrically isolated from the electronic device when the docked power input is unlocked.

Figure 4A:
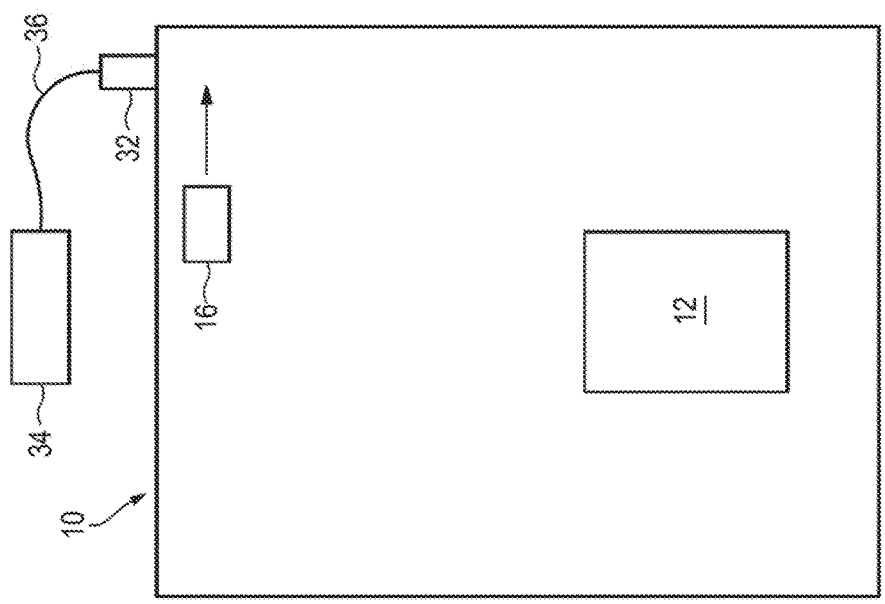
FIGS. 4a and 4b illustrate an electronic device in locked and unlocked states, according to another example.
Figure 4B:
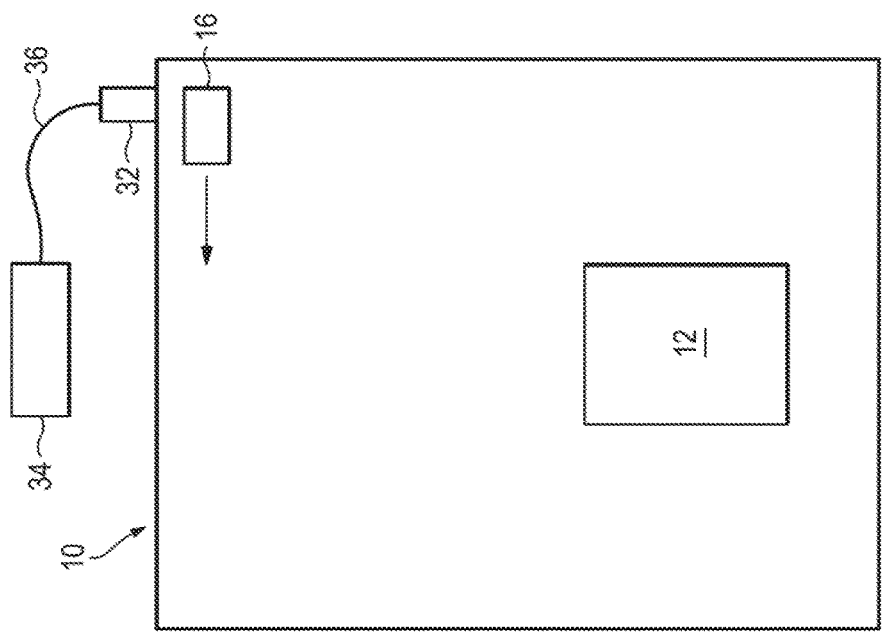

Electronic device 10 can, for example, be in the form of any suitable device that includes one or more electronic components powered by battery pack 14 or another suitable power input (see, e.g., the example electronic device of FIGS. 4a-b). In some implementations, electronic device 10 can be in the form of a laptop computer, mobile phone, desktop computer, standalone server, appliance, or other suitable electronic device.

Electronic component 12 can, for example, be in the form of any suitable component powered by battery pack 14 or another suitable power input. For example, in some implementations, electronic component 12 is in the form of a display screen powered by battery pack 14. The display screen can be any suitable electronic visual display, such as for example a touchscreen, liquid crystal display (LCD), etc. In some implementations, electronic component 12 is in the form of a processing resource powered by battery pack 14. Suitable processing resources can, for example, be in the form of a central processing unit (CPU), a semiconductor-based microprocessing resource, a digital signal processing resource (DSP) such as a digital image processing unit, other hardware devices or processing elements suitable to retrieve and execute instructions stored in a computer-readable medium, or suitable combination thereof. In some implementations, electronic component 12 is in the form of a memory resource powered by battery pack 14. Suitable memory resources can, for example, be in the form of non-transitory storage mediums. The term "non-transitory" as used herein can, for example, refer to mediums that do not encompass a transitory signal but instead are made up of one or more memory resource components configured to store relevant machine-readable instructions. Such mediums can, for example, be in the form of electronic, magnetic, optical, or other physical storage mediums to store information, such as computer instructions.

Multiple electronic components 12 of electronic device 10 can be powered by a single battery pack 14 or multiple battery packs (or other power inputs) and can, in some implementations, be housed within a common housing, such as for example within a common laptop housing, mobile phone housing, computer tower case, rack system, etc. With reference to an example electronic device 10 in the form of a laptop, a single battery pack 14 can power a processing resource, a memory resource, a display screen, various ports, and/or other components of electronic device 10. In some implementations, multiple power inputs can be used to power the same or different electronic components. For example, a first power input in the form of a removable power cord plugged into a wall outlet can power a display screen of electronic device 10 and a second power input in the form of a battery pack can power a processing resource of electronic device 10.

As described above, electronic device 10 includes a power input in the form of battery pack 14. Battery pack 14 can be in the form of one or more batteries or battery cells configured in a series, parallel or a mixture of both to deliver a desired voltage, capacity, or power density. Battery pack 14 can be in the form of a rechargeable or single-use battery type. For example, battery pack 14 can be a lithium-ion battery in which lithium ions move from a negative electrode to a positive electrode during discharge and back when charging. It is appreciated that other types of electrochemical battery packs or other types of battery packs can be used to power electronic device 10. As described below, for example, with respect to FIGS. 4a-b, in some implementations, electronic device 10 can include a power input in a form other than battery pack 14, such s a removable power cord connectable to an external power supply.

As described above, electronic device 10 includes lock 16 to lock battery pack 14 to electronic device 10. Lock 16 can be used to electrically couple or electrically isolate battery pack 14 from electronic component 12 using mateable electronic contacts (describe for example with respect to FIGS. 2a-b) or another suitable electrical coupling (e.g., inductive coupling). As provided above, lock 16 is to move to a locked state (shown, for example, in FIG. 1a) in which docked battery pack 14 is to be locked to electronic device 10 and electrically coupled to electronic component 12 to power electronic component 12 using docked battery pack 14. Lock 16 is also to move to an unlocked state (shown, for example, in FIG. 1b) in which docked battery pack 14 is to be unlocked from electronic device 10 and electrically isolated from electronic component 12. Lock 16 can be in the form of any suitable mechanical lock for use with electronic device 10. For example, in some implementations, lock 16 is slidable relative to electronic device 10 along an opening formed in electronic device 10 between the locked state and the unlocked state. As shown in further detail with respect to FIGS. 2a-b, lock 16 can be in the form of a latch that engages with a latch engagement to lock battery pack 14 to electronic device 10. It is appreciated that other forms of locks can be used, such as for example, magnetic, screw, and/or button locks.

In some implementations, lock 16 can be moved between only the locked state and the unlocked state. For example, a detent or other retaining structure can be provided to secure lock 16 in either the locked state or the unlocked state. In some implementations, lock 16 can be biased (e.g., via a spring) towards the locked state but movable towards the unlocked state if operated by a user. In some implementations, lock 16 can be moved between more than two states. As but one example, lock 16 can be moved between the locked state, an intermediate state, and an unlocked state. In some implementations, lock 16 can be moved to an eject state that is designed to eject a docked power input (e.g., a docked battery pack) from electronic device 10.

FIGS. 2a-b illustrate a bottom view of another example implementation of electronic device 10 in locked and unlocked states, respectively. For illustration, various aspects of the electronic device of FIGS. 1a-b are referred to with respect to the electronic device of FIGS. 2a-b and common reference numbers are used for electronic device 10 and certain components thereof, such as battery pack 14 and electronic component 12. However, it is appreciated that the use of such reference numbers are for illustration and are not intended to suggest that one or more aspects of the various electronic devices described herein are required in ever implementation described herein. Moreover, suitable aspects of the electronic device of FIGS. 2a-b can be implemented in the electronic device of FIGS. 1a-b and vice versa. For example, in some implementations, the electronic device of FIGS. 1a-b can include electrical contacts to electrically couple electronic component 12 to docked battery pack 14 (e.g., as described below with respect to the electronic device of FIGS. 2a-b), whereas in other implementations, the electronic device of FIGS. 1a-b does not include such electrical contacts.

In the implementation of electronic device 10 of FIGS. 2*a-b*, an electronic component contact 18 is provided to receive electrical current to power electronic component 12. Likewise, a battery pack contact 20 is provided to transmit electrical current to electronic component 12 when battery pack contact 20 is electrically coupled to electronic component contact 18. Electronic component contact 18 can be electrically coupled to electronic component 12 via suitable electrical circuitry to form a circuit 22. Likewise, battery pack contact 20 can be electrically coupled to a power source of battery pack 14 via suitable electrical circuitry to form another circuit 24. It is appreciated that the electrical circuitry can, for example, include electrically conductive wire or other electrical conductors. The electrical circuitry can, in some implementations, be designed to move along with lock 16 or can, in some implementations, be designed to remain fixed relative to electronic device 10 as lock 16 is moved.

The various electrical contacts can, for example, be composed of electrically conductive metal that pass electrical current or insulate when a gap between them is closed or opened, respectively. For example, in some implementations, the various electrical contacts can be composed of silver, gold, copper, or another suitable material. In some implementations, a first contact (e.g., electronic component contact 18) can be composed of a first conductive material (e.g., gold) and a second contact (e.g., battery pack contact 20) can be composed of a second conductive material (e.g., silver).

In some implementations, electronic component contact 18 is to move with lock 16 between the locked state and the unlocked state and battery pack contact 20 is to be fixed relative to battery pack 14. In this implementation, after battery pack 14 is docked within electronic device 10, lock 16 is actuated to move electronic component contact 18 such that electronic component contact 18 engages with battery pack contact 20. In some implementations, battery pack contact 20 is to move with lock 16 between the locked state and the unlocked state and electronic component contact 18 is to be fixed relative to electronic component 12. In this implementation, after battery pack 14 is docked within electronic device 10, lock 16 is actuated to move battery pack contact 20 such that battery pack contact 20 engages with electronic component contact 18.

As illustrated in FIGS. 2*a-b*, lock 16 includes a latch 26 that is engageable with a latch engagement 28 to lock battery pack 14 to electronic device 10. An example structure of latch 26 is illustrated in FIGS. 2*a-b*, however, it is appreciated that other suitable structures for latch 26 can be implemented in accordance with the present disclosure. For example, in some implementations (e.g., as depicted in FIGS. 2*a-b*), latch 26 is an "L"-shaped latch, whereas in other implementations, latch is another suitable shape for engaging with a latch engagement. In some implementations, latch 26 is to secure battery pack 14 to electronic device 10 through an interference fit. In some implementations, latch 26 is to secure battery pack 14 to electronic device 10 through another locking structure, such as a suitable magnetic locking structure or suitable detent locking structure. Additional locks can be provided to electronic device to provide desired locking of battery pack 14. For example, one implementation of an electronic device with multiple locks is illustrated and described below with respect to FIGS. *a-b*.

FIGS. 3*a-b* illustrate another example implementation of an electronic device, which includes an electronic indicator 30. For illustration, various aspects of the electronic device of FIGS. 1*a-b* and 2*a-b* are referred to with respect to the electronic device of FIGS. 3*a-b* and common reference numbers are used for electronic device 10 and certain components thereof, such as battery pack 14 and electronic component 12. However, it is appreciated that the use of such reference numbers are for illustration and are not intended to suggest that one or more aspects of the various electronic devices described herein are required in every implementation described herein. Moreover, suitable aspects of the electronic device of FIGS. 3*a-b* can be implemented in the electronic device of FIGS. 1*a-b* and 2*a-b* and vice versa. For example, some implementations of the electronic device of FIGS. 1*a-b* can include an electronic indicator (e.g., as described below with respect to the electronic device of FIGS. 3*a-b*), whereas in other implementations, the electronic device of FIGS. 1*a-b* does not include such an electronic indicator.

Electronic indicator 30 can, for example, be designed to light up when electronic device 10 is electrically coupled to a power input and the power input is locked into place. Electronic indicator 30 can, for example, be independent of a power switch or other power button of electronic device 10 and designed to provide an indication regardless of whether electronic device is actually turned on or off. For example, in implementations where lock 16 is on an underside of electronic device 10, electronic indicator 30 can allow an operator to determine that an electrical connection is made without a user separately turning on electronic device 10. For example, electronic indicator 30 can be arranged in series between battery pack contact 20 and a power source of battery pack 14 such that when battery pack contact 20 is mated with electronic component contact 18, a circuit is closed to thereby pass current through electronic indicator 30. If battery pack 14 is docked within a cavity of electronic device 10 but is not "locked" into place and electrically connected, current will not be passed through electronic indicator 30 and electronic indicator 30 will indicate the state to the operation (e.g., by not illuminating).

Several examples of this implementation refer to the use of battery pack 14, however another suitable power input (see, e.g., the power input of FIG. 4*a-b*) can be used. Electronic indicator 30 can, in some implementations, be used to indicate to a user that electronic component 12 is electrically coupled to the power input. For example, in some implementations, electronic indicator 30 can be in the form of a light-emitting diode (LED) or other light source that is to light up (see, e.g., electronic indicator 30 of FIG. 3*a*) when electronic component 12 is electrically coupled to battery pack 14 and is to not light up (see, e.g., electronic indicator 30 of FIG. 3*b*) when electronic component 12 is electrically isolated from battery pack 14. In some implementations, electronic indicator 30 can provide a first indication if a docked power input is not electrically coupled to the electronic component (e.g., a red light) and can provide a second indication if the docked power input is electrically coupled to the electrical component (e.g., a blue light).

In some implementations, other forms of electronic indicator 30 can be used. For example, in some implementations, electronic indicator 30 can produce an audio cue, such as a beep or other noise to indicate that battery pack 14 or another power input is securely locked to electronic device 10 and electrically connected to electronic component 12. As illustrated in FIGS. 3*a-b*, electronic indicator 30 is incorporated in battery pack 14, however in some implementations, electronic indicator 30 can be incorporated in a housing of electronic device 10 or another component of electronic device 10.

FIGS. 4*a-b* illustrate another example implementation of electronic device, which includes a power input 32 in the form of a power cord connectable to an external power supply 34 rather than an internal battery pack (for example as shown in FIGS. 1*a-b*). For illustration, various aspects of the electronic device of FIGS. 1*a-b* are referred to with respect to the electronic device of FIGS. 4*a-b* and common reference numbers are used for electronic device 10 and certain components thereof, such as lock 16 and electronic component 12. However, it is appreciated that the use of such reference numbers are for illustration and are not intended to suggest that one or more aspects of the various electronic devices described herein are required in every implementation described herein. Moreover, suitable aspects of the electronic device of FIGS. 4*a-b* can be implemented in the electronic device of FIGS. 1*a-b* or other electronic devices described herein and vice versa. For example, some implementations of the electronic device of FIGS. 4*a-b* can include electrical contacts to electrically couple the electronic component to the docked power input 32 (e.g., as described below with respect to the electronic device of FIGS. 2*a-b*), whereas in other implementations, the electronic device of FIGS. 4*a-b* does not include such electrical contacts.

In some implementations, electronic device 10 can include a combination of power inputs, such as a power cord that is dockable to electronic device 10 and electrically connectable to electronic component 12 as well as a battery pack (as shown for example in FIGS. 1*a-b*) that is dockable to electronic device 10 and electrically connectable to electronic component 12. Details of an example lock 16 for use with electronic device 10 of FIGS. 4*a-b* is illustrated and described above with respect to FIGS. 2*a-b*. However, it is appreciated, that other forms of lock 16 can be implemented with electronic device 10.

External power supply 34 can be any suitable power supply for powering electronic device 10. For example, in some implementations, external power supply 34 can be a suitable wall outlet. Likewise, in some implementations, external power supply 34 can be a suitable external battery pack, which can for example, share aspects of battery pack 14 described herein or can be another form of battery pack. It is appreciated that external power supply 34 can be in the form of a second electronic device to power electronic device 10. For example, in implementations where electronic device 10 is a mobile phone, the second electronic device can be a laptop that can power electronic device 10 using a Universal Serial Bus (USB) cable.

Power cord-type power inputs can be in the form of any suitable type of electrical plug to power electronic component 12. For example, in some implementations, a stand-alone power cable can be used. Likewise, in some implementations power cables designed to transfer power and data can be used. In some implementations, data signals can be passed along with power signals through power input 32.

FIGS. 5*a-b* illustrate another example implementation of an electronic device, which includes separate locks and related electronic circuits. For illustration, various aspects of the electronic device of FIGS. 2*a-b* are referred to with respect to the electronic device of FIGS. 5*a-b* and common reference numbers are used for electronic device 10 and certain components thereof, such as lock 16, electronic components 12, latch 26, and latch engagement 28. However, it is appreciated that the use of such reference numbers are for illustration and are not intended to suggest that one or more aspects of the various electronic devices described herein are required in every implementation described herein. Moreover, suitable aspects of the electronic device of FIGS. 5*a-b* thereof can be implemented in the electronic device of FIGS. 2*a-b* or other electronic devices described herein and vice versa. For example, some implementations of the electronic device of FIGS. 5*a-b* can include electronic indicator 30 (e.g., as described with respect to the electronic device of FIGS. 3*a-b*), whereas in other implementations, the electronic device of FIGS. 5*a-b* does not include such an electronic indicator.

As illustrated in FIGS. 5*a-b*, electronic device 10 includes a first lock 16 to selectively secure a first portion of electronic device 10 to a docked power input (in the form of battery pack 14 in the example of FIGS. 5*a-b*). Electronic component 12 includes a first electronic component contact 18 to electrically couple a first circuit 22 of electronic component 12 to a first circuit 24 of battery pack 14 in the locked state and to electrically isolate first circuit 22 of electronic component 12 from first circuit 24 of battery pack 14 in the unlocked state.

Electronic device 10 further includes a second lock 38 that is separately operable with respect to first lock 16 to selectively secure a second portion of electronic device 10 to docked battery pack 14. Second lock 38 is to move relative to electronic device 10 to a locked state in which the second portion of electronic device 10 is to be secured to docked battery pack 14. Second lock 38 is to move relative to electronic device 10 to an unlocked state in which the second portion of electronic device 10 is to not be secured to docked battery pack 14. Electronic device 10 further includes a second contact 40 that is to move with second lock 38 to electrically couple a second circuit 42 of electronic component 12 to a second circuit 44 of battery pack 14 (via a second battery pack contact 46) in the locked state and to electrically isolate second circuit 42 of electronic component 12 from second circuit 44 of battery pack 14 in the unlocked state.

With reference to the description of FIGS. 2*a-b* above, first lock 16 and second lock 38 can each include respective latches 26 and 48 that are engageable with respective latch engagements 28 and 50 to lock battery pack 14 to electronic device 10. As illustrated in FIGS. 5*a-b*, both latches 26 and 48 are "L"-shaped latches, whereas in other implementations, latches 26 and 48 can be other suitable shapes for engaging with a latch engagement. For example, latch 26 can be in the form of a first shape with latch 48 being in the form of a second shape. In some implementations, lock 16 and lock 38 can be different types of locks. For example, in some implementations, first lock 16 can be in the form of a mechanical latch for engagement with a mechanical latch engagement of battery pack 14, whereas second lock 38 can be in the form of a magnetic lock for engagement with a corresponding engaging piece of battery pack 14. It is appreciated that any suitable number or arrangement of locks can be used with electronic device 10. For example, in some implementations, more than two locks are used to secure battery pack 14 to electronic device 10. As another example, in some implementations, a first lock is integrated with electronic device 10 and a corresponding engaging piece is integrated with battery pack 14, whereas a second lock is integrated with battery pack 14 and a corresponding engaging piece is integrated with electronic device 10. It is appreciated that battery pack 14 is used throughout this disclosure as an example power input, however, aspects of the various locks, contacts, etc., can be applied to another form of power input (e.g., such as power input 32 of FIGS. 4*a-b*).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be understood that the devices described herein can include various combinations and/or sub-combinations of the components and/or features of the different implementations described. Thus, features described with reference to one or more implementations can be combined with other implementations described herein.

The above discussion is meant to be illustrative of the principals and various implementations of the present disclosure. Numerous variations and modifications will become apparent to those skilled in the art one the above disclosure is fully appreciated. It is intended that the following claims be interpreted to embrace all such variations and modifications.

What is claimed is:

1. An electronic device comprising:
   an electronic component and including an electrical component contact to receive electrical current to power the electronic component;
   a battery pack that is dockable to the electronic component and that includes a battery pack contact to transmit electrical current to the electronic component contact; and
   a lock to lock a docked battery pack to the electronic device,
   wherein the lock is to move to a locked state in which the docked battery pack is to be locked to the electronic device and electrically coupled to the electronic component to power the electronic component using the docked battery pack,
   wherein the lock is to move to an unlocked state in which the docked battery pack is to be unlocked from the electronic device and electrically isolated from the electronic component,
   and wherein the electronic component contact is to move with the lock between the locked state and the unlocked state.

2. The electronic device of claim 1, wherein when the electronic component contact is moved with the lock between the locked state and the unlocked state, the battery pack contact is to be fixed relative to the battery pack.

3. The electronic device of claim 1, wherein the lock is to slide relative to the electronic device between the locked state and the unlocked state.

4. The electronic device of claim 1, wherein the electronic device is a laptop computer to be powered by the battery pack.

5. The electronic device of claim 1, wherein the electronic device is a mobile phone to be powered by the battery pack.

6. An electronic device comprising:
   an electronic component; and
   a lock to selectively secure a docked power input to the electronic device;
   wherein the lock is to move relative to the electronic device to a locked state in which the docked power input is to be secured to the electronic device,
   wherein the lock is to move relative to the electronic device to an unlocked state in which the docked power input is to not be secured to the electronic device,
   wherein the electronic device includes a contact that is to move with the lock to electrically couple the electronic component to the power input in the locked state and to electrically isolate the electronic component from the power input in the unlocked state.

7. The electronic device of claim 6, wherein the electronic device comprises the power input, and
   wherein the power input is in the form of a battery pack.

8. The electronic device of claim 6, wherein the power input is a power cord connectable to an external power supply.

9. The electronic device of claim 6, further comprising:
   an electronic indicator to indicate whether the electronic component is electrically coupled to the power input.

10. The electronic device of claim 9, wherein the electronic indicator is to light up when the electronic component is electrically coupled to the power input.

11. The electronic device of claim 6, wherein the lock is a first lock to selectively secure a first portion of the electronic device to the docked power input and wherein the contact is a first contact to electrically couple a first circuit of the electronic component to a first circuit of the power input in the locked state and to electrically isolate the first circuit of the electronic component from the first circuit of the power input in the unlocked state,
    wherein the electronic device further comprises:
    a second lock that is separately operable with respect to the first lock to selectively secure a second portion of the electronic device to the docked power input;
       wherein the second lock is to move relative to the electronic device to a locked state in which the second portion of the electronic device is to be secured to the docked power input,
       wherein the second lock is to move relative to the electronic device to an unlocked state in which the second portion of the electronic device is to not be secured to the docked power input; and
    a second contact that is to move with the second lock to electrically couple a second circuit of the electronic component to a second circuit of the power input in the locked state and to electrically isolate the second circuit of the electronic component from the second circuit of the power input in the unlocked state.

12. An electronic device comprising:
    an electronic component including an electrical component contact to receive electrical current to power the electronic component;
    a battery pack that is dockable to the electronic device, the battery pack including a battery pack contact to transmit electrical current to the electronic component contact through the battery pack contact; and
    a lock to lock the battery pack to the electronic device, wherein the lock is to move relative to the electronic device and a docked battery pack between a locked state and an unlocked state,
    wherein in the locked state the electronic component contact is to be electrically coupled to the docked battery pack contact to power the electronic component using the docked battery pack,
    wherein in the unlocked state the electronic component contact is to be electrically isolated from the docked battery pack contact,
    and wherein the electronic component contact is to move with the lock between the locked state and the unlocked state.

13. The electronic device of claim 12, wherein the electronic device is to electrically isolate the electronic component from both the battery pack and another power input when the electronic device is in the unlocked state.

14. The electronic device of claim 12, wherein when the electronic component contact is moved with the lock between the locked state and the unlocked state, the battery pack contact is to be fixed relative to the battery pack.

\* \* \* \* \*